United States Patent
Park

(10) Patent No.: US 12,530,162 B2
(45) Date of Patent: Jan. 20, 2026

(54) FOLDABLE ELECTRONIC DEVICE, AND DISPLAY UTILIZATION METHOD FOR FOLDABLE ELECTRONIC DEVICE

(71) Applicant: Samsung Electronics Co., Ltd., Suwon-si (KR)

(72) Inventor: Heesoon Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 19/051,835

(22) Filed: Feb. 12, 2025

(65) Prior Publication Data

US 2025/0181299 A1   Jun. 5, 2025

Related U.S. Application Data

(63) Continuation of application No. PCT/KR2023/010141, filed on Jul. 14, 2023.

(30) Foreign Application Priority Data

Aug. 23, 2022   (KR) .................. 10-2022-0105336

(51) Int. Cl.
*G06F 3/14* (2006.01)
*H02J 50/10* (2016.01)

(52) U.S. Cl.
CPC ............ *G06F 3/1423* (2013.01); *H02J 50/10* (2016.02)

(58) Field of Classification Search
CPC ...... G06F 3/1423; G06F 1/16; G06F 3/04166; G06F 2203/04102; G06F 3/0416;
(Continued)

(56) References Cited

U.S. PATENT DOCUMENTS 8,860,632 B2 * 10/2014 Kilpatrick, II ........ G06F 3/1446
345/38
10,409,540 B2   9/2019 Cho et al.
(Continued)

FOREIGN PATENT DOCUMENTS

CN      112860359 A    5/2021
EP       3896946 A1   10/2021
(Continued)

OTHER PUBLICATIONS

International Search Report for PCT/KR2023/010141 mailed Oct. 19, 2023, 4 pages with English translation.
(Continued)

*Primary Examiner* — Pegeman Karimi
(74) *Attorney, Agent, or Firm* — Nixon & Vanderhye, P.C.

(57) ABSTRACT

The present disclosure can include a method and a device in which the instructions, when executed by the at least one processor, individually and/or collectively, cause the foldable electronic device to: acquire sensing data from a sensor module in an unfolded state of a foldable electronic device in which one surface of a first housing and one surface of a second housing are arranged to be oriented in a same direction; determine, based on the sensing data, whether the foldable electronic device corresponds to a designated condition; and based on the foldable electronic device corresponding to the designated condition, deactivate a first display and activate a second display.

20 Claims, 10 Drawing Sheets

(58) Field of Classification Search
CPC .... H02J 50/10; H04M 1/0216; H04M 1/0245; H04M 1/72454; H04M 1/0214; H04M 2201/34; H04M 2250/12
See application file for complete search history.

(56) References Cited

U.S. PATENT DOCUMENTS

| | | |
|---|---|---|
| 10,809,962 B2 | 10/2020 | Files et al. |
| 10,876,832 B2 | 12/2020 | Lee et al. |
| 11,126,223 B2 | 9/2021 | Seo et al. |
| 11,551,595 B2 | 1/2023 | Yoon et al. |
| 2015/0378557 A1 | 12/2015 | Jeong et al. |
| 2017/0229100 A1* | 8/2017 | Chun ................. G09G 5/38 |
| 2017/0293383 A1* | 10/2017 | Lee ................... G06F 1/1641 |
| 2022/0122514 A1* | 4/2022 | Kwon ................ G06F 3/1446 |
| 2022/0129041 A1 | 4/2022 | Kim et al. |
| 2022/0317847 A1 | 10/2022 | Kim et al. |
| 2022/0413553 A1* | 12/2022 | Zhang ............... G06F 1/1677 |
| 2023/0080358 A1 | 3/2023 | Han et al. |
| 2023/0185507 A1 | 6/2023 | Lee et al. |
| 2023/0185508 A1 | 6/2023 | Chung |
| 2023/0336655 A1 | 10/2023 | Lee |

FOREIGN PATENT DOCUMENTS

| | | |
|---|---|---|
| EP | 4124005 A1 | 1/2023 |
| KR | 20210133201 A | 11/2021 |
| KR | 20210135086 A | 11/2021 |
| KR | 20210144461 A | 11/2021 |
| KR | 20220017152 A | 2/2022 |
| KR | 20220110406 A | 8/2022 |
| WO | 2020156269 A1 | 8/2020 |
| WO | 2021045264 A1 | 3/2021 |
| WO | 2022030990 A1 | 2/2022 |

OTHER PUBLICATIONS

Written Opinion of the ISA for PCT/KR2023/010141 mailed Oct. 19, 2023, 5 pages.
Extended European Search Report dated Sep. 10, 2025 issued in European Patent Application No. 23857567.4.

* cited by examiner

FOLDABLE ELECTRONIC DEVICE, AND DISPLAY UTILIZATION METHOD FOR FOLDABLE ELECTRONIC DEVICE

CROSS-REFERENCE TO RELATED APPLICATIONS

This application is a continuation of International Application No. PCT/KR2023/010141 designating the United States, filed on Jul. 14, 2023, in the Korean Intellectual Property Receiving Office and claiming priority to Korean Patent Application No. 10-2022-0105336, filed on Aug. 23, 2022, in the Korean Intellectual Property Office, the disclosures of each of which are incorporated by reference herein in their entireties.

BACKGROUND

Field

The disclosure relates a foldable electronic device and a display utilization method for a foldable electronic device.

Description of Related Art

With the development of digital technologies, various types of electronic devices, such as a mobile communication terminal, a personal digital assistant (PDA), an electronic notebook, a smartphone, a tablet personal computer (PC), or a wearable device, have been widely used. An electronic device may have a limited size for portability and thus limitation in size of a display. Accordingly, in recent years, various types of electronic devices providing a more expanded screen by a multi-display have been developed.

For example, inclusion of multiple displays provides an extended screen by multi-display. For another example, electronic devices are designed such that the sizes of screens gradually increase in the displays, and such that various services are provided to users through larger screens. Such electronic devices may have a new form factor such as a multi-display (e.g., a dual display) device (e.g., a foldable device, a rollable device, or a slidable device). The foldable device may include a foldable (or bendable) display (e.g., a foldable display) or a flexible display and may be folded or unfolded to be used. A rollable device or a slidable device may include a flexible display, and roll and receive the flexible display on a rear surface of the rollable device or extend the flexible display to a front surface of the rollable device to use same.

SUMMARY

Embodiments of the disclosure may provide a method and a device for controlling a sub-display to be used instead of a main display when the main display faces the ground when a foldable electronic device is unfolded (e.g., an unfolded state) and turned over.

A foldable electronic device according to an example embodiment of the disclosure may include: a first housing and a second housing disposed on opposite sides with respect to a folding axis and configured to be folded relative to each other, a first display disposed to face a first direction of one of the first housing and the second housing, a second display disposed to face a second direction opposite the first direction of the first housing or the second housing, a sensor module including at least one sensor, a memory, and at least one processor, comprising processing circuitry, operatively connected to the first display, the second display, the sensor module, and/or the memory, wherein the instructions that, when executed by the at least one processor, individually and/or collectively, cause the foldable electronic device to: acquire sensing data from the sensor module in an unfolded state of a foldable electronic device where one surface of the first housing and one surface of the second housing are arranged to face a same direction, determine, based on the sensing data, whether the foldable electronic device corresponds to a designated condition, and based on the foldable electronic device corresponding to the designated condition, deactivate the first display and activate the second display.

According to an example embodiment, a method of operating a foldable electronic device including a first housing and a second housing disposed on opposite sides with respect to a folding axis and configured to be folded relative to each other may include: acquiring sensing data from a sensor module of the foldable electronic device in an unfolded state of the foldable electronic device, where one surface of the first housing and one surface of the second housing are arranged to face a sane direction, determining, based on the sensing data, whether the foldable electronic device corresponds to a designated condition, and based on the foldable electronic device corresponding to the designated condition, activating a second display disposed to face a second direction opposite a first direction of one of the first housing or the second housing, and deactivating a first display disposed to face the first direction of the first housing and the second housing.

According to an example embodiment, the use of an outer display having a smaller area than an inner display may reduce power consumption of a foldable electronic device. This has the effect of increasing the overall usage time of the foldable electronic device.

According to an example embodiment, the outer display is used while performing wireless charging in an unfolded state of the foldable electronic device, thus improving the usability of the foldable electronic device.

According to an example embodiment, the wireless connection with external devices arranged in the foldable electronic device for wireless charging may enable data transmission and reception with the external devices. This has the effect of reinforcing the interoperability between the foldable electronic device and external devices.

According to an example embodiment, even when multiple external devices are used not only for the foldable electronic device, the foldable electronic device may be used to conveniently charge each external device without the need to carry separate charger, thus enhancing the usability of both the foldable electronic device and the external devices.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
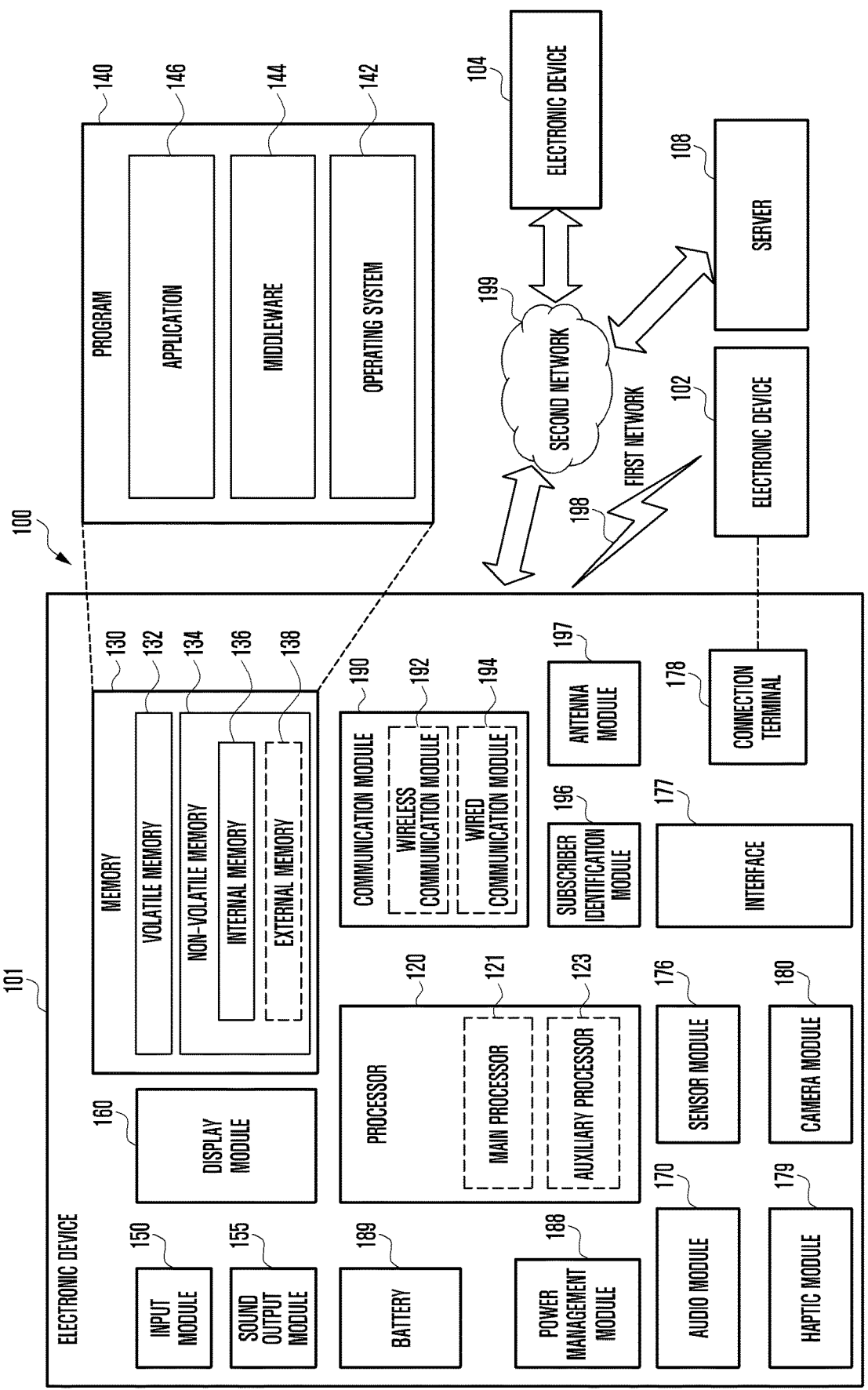
FIG. 1 is a block diagram illustrating an example electronic device in a network environment according to various embodiments.

FIG. 1 is a block diagram illustrating an example electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5th generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4th generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to certain embodiments, the antenna module 197 may form a mmWave antenna module. According to an embodiment, the mmWave antenna module may include a printed circuit board, an RFIC disposed on a first surface (e.g., the bottom surface) of the PCB, or adjacent to the first surface and capable of supporting a designated high-frequency band (e.g., the mmWave band), and a plurality of antennas (e.g., array antennas) disposed on a second surface (e.g., the top or a side surface) of the PCB, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments disclosed herein may be one of various types of electronic devices. The electronic devices may include, for example, a portable communication device (e.g., a smart phone), a computer device, a portable multimedia device, a portable medical device, a camera, a wearable device, a home appliance, or the like. The electronic device according to embodiments of the disclosure is not limited to those described above.

It should be appreciated that various embodiments of the disclosure and the terms used therein are not intended to limit the technological features set forth herein to particular embodiments and include various changes, equivalents, or alternatives for a corresponding embodiment. With regard to the description of the drawings, similar reference numerals may be used to designate similar or relevant elements. A singular form of a noun corresponding to an item may include one or more of the items, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "a first", "a second", "the first", and "the second" may be used to simply distinguish a corresponding element from another, and does not limit the elements in other aspect (e.g., importance or order). It is to be understood that if an element (e.g., a first element) is referred to, with or without the term "operatively" or "communicatively", as "coupled with/to" or "connected with/to" another element (e.g., a second element), the element may be coupled/connected with/to the other element directly (e.g., wiredly), wirelessly, or via a third element.

As used herein, the term "module" may include a unit implemented in hardware, software, or firmware, or any combination thereof, and may be interchangeably used with other terms, for example, "logic," "logic block," "component," or "circuit". The "module" may be a minimum unit of a single integrated component adapted to perform one or more functions, or a part thereof. For example, according to an embodiment, the "module" may be implemented in the form of an application-specific integrated circuit (ASIC).

Various embodiments as set forth herein may be implemented as software (e.g., the program 140) including one or more instructions that are stored in a storage medium (e.g., the internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each element (e.g., a module or a program) of the above-described elements may include a single entity or multiple entities, and some of the multiple entities mat be separately disposed in any other element. According to various embodiments, one or more of the above-described elements may be omitted, or one or more other elements may be added. Alternatively or additionally, a plurality of elements (e.g., modules or programs) may be integrated into a single element. In such a case, according to various embodiments, the integrated element may still perform one or more functions of each of the plurality of elements in the same or similar manner as they are performed by a corresponding one of the plurality of elements before the integration. According to various embodiments, operations performed by the module, the program, or another element may be carried out sequentially, in parallel, repeatedly, or heuristically, or one or more of the operations may be executed in a different order or omitted, or one or more other operations may be added.

Figure 2A:
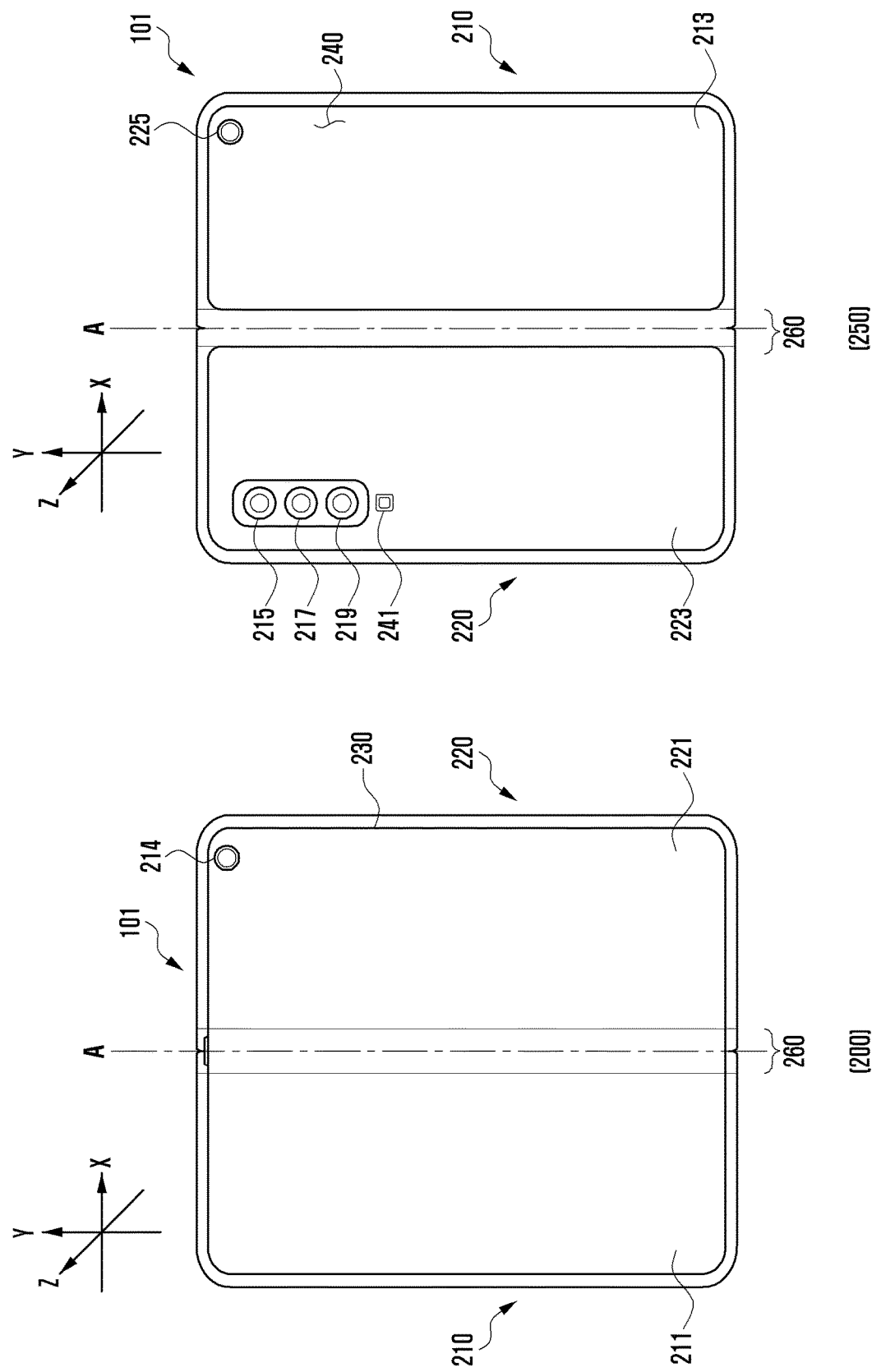
FIG. 2A is a diagram illustrating an unfolded state of a foldable electronic device according to various embodiments.

FIG. 2A is a diagram illustrating a front surface 200 of an electronic device 101 and a rear surface 250 of the electronic device 101 in an unfolded state of the foldable electronic device according to various embodiments.

Referring to FIG. 2A, the foldable electronic device (e.g., the electronic device 101 in FIG. 1) according to various embodiments may include a first housing 210 including a first surface 211 and a third surface 213 and a second housing 220 including a second surface 221 and a fourth surface 223. The first surface 211 of the first housing 210 and the second surface 221 of the second housing 220 may represent the front surface 200 of the electronic device 101, and the third surface 213 of the first housing 210 and the fourth surface 223 of the second housing 220 may represent the rear surface 250 of the electronic device 101.

The first housing 210 and the second housing 220 may be arranged on opposite sides with respect to the folding axis (e.g., A-axis) and may have substantially symmetric shapes with respect to the folding axis. For example, with respect to the front surface 200 of the electronic device 101, the first housing 210 may correspond to the left of the electronic device 101 and the second housing 220 may correspond to the right of the electronic device 101 with reference to the folding axis. The first housing 210 and the second housing 220 may be designed to be folded relative to each other. The hinge structure 260 may be disposed between the first housing 210 and the second housing 220 so that the front surface 200 of the electronic device 101 may be folded.

An angle and distance between the first housing 210 and the second housing 220 may vary according to whether a state of the electric device 101 is the unfolded (or open) state, the folded (closed) state, or an intermediate state. For example, the unfolded state (or unfolding state) may indicate an expanded state, an open state, or a flat (or planar) state. The unfolded state may indicate a state where the first housing 210 and the second housing 220 are arranged in parallel and may indicate a state where the electronic device 101 is fully unfolded. In the unfolded state, the angle between the first housing 210 and the second housing 220 is 180 degrees and the first surface 211 of the first housing 210 and the second surface 221 of the second housing 220 may be arranged to face an identical direction (e.g., a first direction). FIG. 2A is a view illustrating the front surface 200 of the electronic device 101 and the rear surface 250 of the electronic device 101 in the unfolded state of the electronic device 101.

Figure 2B:
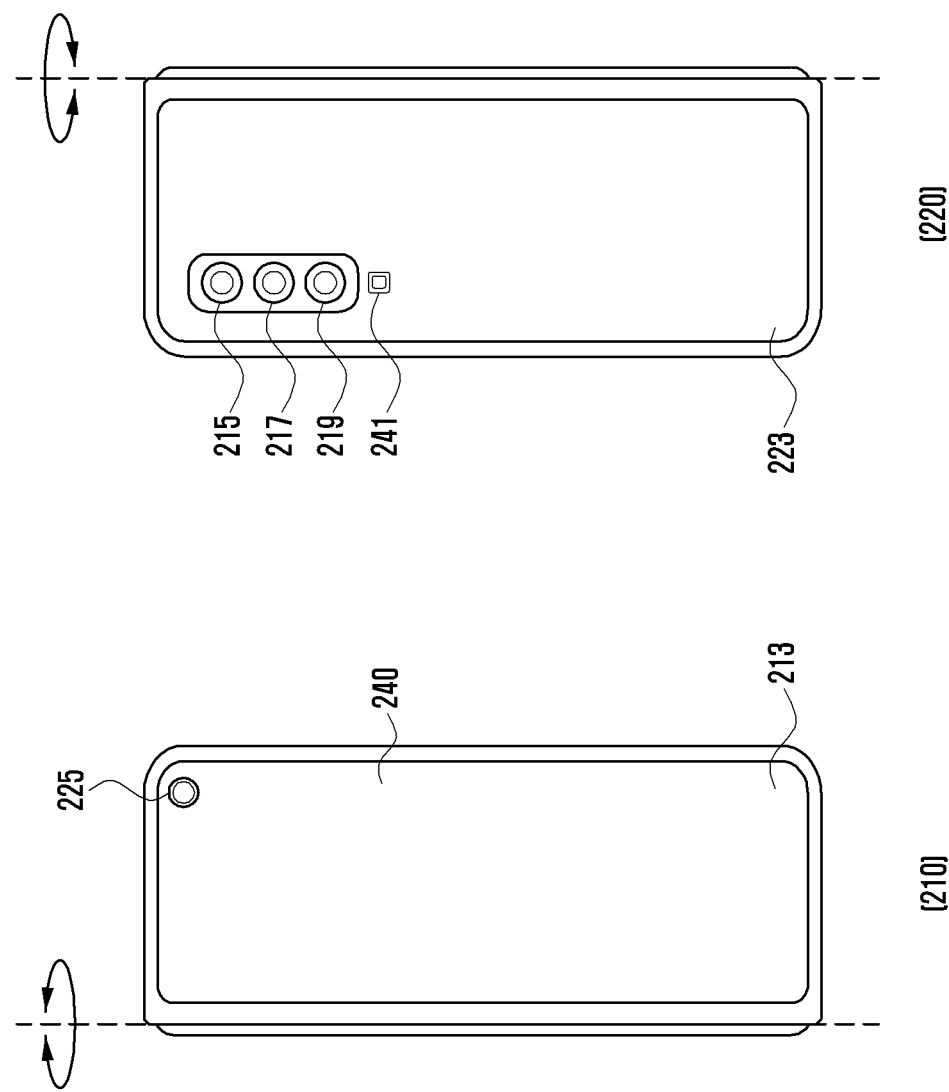
FIG. 2B is a diagram illustrating a folded state of a foldable electronic device according to various embodiments.

The folded state may indicate a folded state, a folding state, a closed state, or a close state (e.g., FIG. 2B). The folded state may indicate a state where the first housing 210 and the second housing 220 are arranged to face each other and may indicate a state where the electronic device 101 is completed folded. In the folded state, the angle between the first housing 210 and the second housing 220 is narrow (e.g., 0 degrees to 5 degrees) and the first surface 211 of the first housing 210 and the second surface 221 of the second housing 220 may face each other. Hereinafter, although the folding manner is described based on the electronic device 101 implemented in an in-folding manner, the folding manner may be applied identical or similar to the electronic device 101 implemented in an out-folding manner.

Figure 2C:
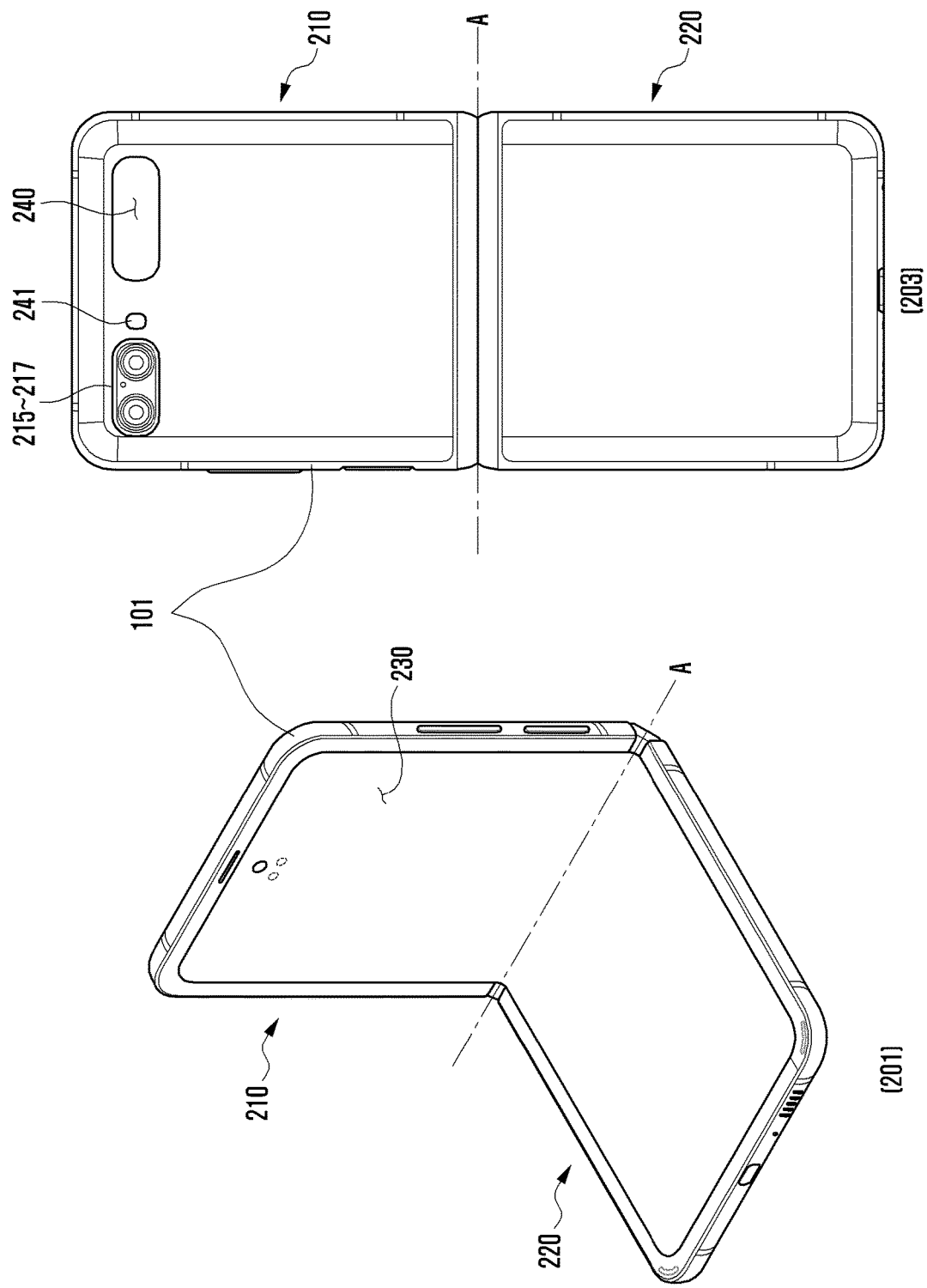
FIG. 2C is a diagram illustrating an intermediate state or an unfolded state of a foldable electronic device according to various embodiments.

The intermediate state may correspond to a state where the first housing 210 and the second housing 220 are arranged to have a predetermined angle therebetween and the electronic device 101 may not be in the unfolded state or the folded state (e.g., FIG. 2C). The intermediate state may indicate a state where the first surface 211 of the first housing 210 and the second surface 221 of the second housing 220 are arranged to have a predetermined angle (e.g., 6 degrees to 179 degrees) therebetween.

The electronic device 101 may include a first display 230 (e.g., a main display) (e.g., the display module 160 in FIG. 1) on the first surface 211 and the second surface 221 which corresponds to the front surface 200 of the electronic device. The first display 230 may be disposed to entirely occupy the front surface 200 (e.g., the first direction of the electronic device 101). The first display 230 may be referred to as a flexible display having at least a partial area transformable to a flat surface or a curved surface. The first display 230 may be folded to the left or to the right with respect to the folding axis (e.g., A-axis). The first display 230 may include a first display area corresponding to the first surface 211 and a second display area corresponding to the second surface 221. In addition, the electronic device 101 may include a first camera 214 in the second surface 221. In the drawing, although one first camera 214 is illustrated, multiple first cameras 214 may be configured. In the drawing, although it is described that the first camera 214 is disposed on the second surface 221, the first camera 214 may be disposed on the first surface 211.

In addition, the electronic device 101 may include the second display 240 (e.g., a sub-display or cover display) (e.g., the display module 160 in FIG. 1) in a portion of the rear surface 250 of the electronic device. The second display 240 may be disposed in at least a portion of the third surface 213 of the electronic device 101. The electronic device 101 may include multiple cameras (e.g., 215, 217, 219, and 225) on the rear surface 250 of the electronic device 101. For example, the electronic device 101 may include a second camera 215, a third camera 217, and a fourth camera 219 disposed on the fourth surface 223 and a fifth camera 225 in the third surface 213. According to various embodiments, the second camera 215, the third camera 217, the fourth camera 219, and the fifth camera 225 may have the same or different performances (e.g., a field of view and resolution). For example, the second camera 215 may have a field of view (FOV) exceeding 125 degrees (e.g., ultra-wide), the third camera 217 may have a FOV ranging from 90 to 125 degrees (e.g., wide), the fourth camera 219 may have a FOV of 90 degrees with 2× zoom (e.g., telephoto), and the fifth camera 225 may have a FOV of 90 degrees with a standard magnification. The electronic device 101 may further include a sensor area 241 in the fourth surface 223. An infrared sensor, a fingerprint sensor, or an illuminance sensor may be disposed on the sensor area 241 similar to the sensor module 176 in FIG. 1.

According to various embodiments, in the unfolded state (e.g., 2A) of the electronic device 101, the first display 230 may be turned on (or activated) and the second display 240 may be turned off (or inactivated). As used herein, the terms "turned off", "inactivated", and/or "deactivated" may be used interchangeably and may refer to the same condition. When a user's input (e.g., a touch or button selection) has not been detected for a predetermined time (e.g., 5 seconds, 10 seconds, or 1 minute) in a state where the first display 230 is turned on, the electronic device 101 may turn off the first display 230. Alternatively, when a user's input (e.g., a touch or button selection) is detected in the second display 240 in a state where the second display 240 is turned off, the electronic device 101 may turn on the second display 240. According to various embodiments, when the second display 240 is turned on, the first display 230 may be turned off. Alternatively, when no user's input is detected on the first display 230 after the first display 230 is maintained in an on-state for a predetermined time even if the second display 240 is turned on, the electronic device 101 may turn off the first display 230.

The electronic device 101 may further include a sensor module (e.g., the sensor module 176 in FIG. 1). For example, the electronic device 101 may include the sensor module 176 in at least one of the first housing 210 or the second housing 220. The sensor module 176 may include at least one of an acceleration sensor, a gyroscope sensor, a geomagnetic sensor, a proximity sensor, a light sensor, a gesture sensor, or a Hall sensor. The acceleration sensor may be a sensor that detects speed, and the gyroscope sensor may detect the angular velocity, which is the rotation speed of an object. The geomagnetic sensor may be a sensor that detects terrestrial magnetism, and may detect, like a compass, geomagnetic directions (e.g., azimuth) such as cast, west, south, and north. The proximity sensor may detect whether an object is close, and the illuminance sensor may measure the amount of ambient light (e.g., illuminance) in real time or periodically. The gesture sensor may detect infrared light. The Hall sensor may detect changes in electrical signals based on the proximity or distance of an object with magnetism (or magnetic force). When the Hall sensor is utilized to detect a folded state of the electronic device 101, the electronic device 101 may further include a magnet corresponding to the Hall sensor.

FIG. 2B is a diagram illustrating a folded state of a foldable electronic device according to various embodiments.

Referring to FIG. 2B, the electronic device 101 may include the hinge structure 260 around the folding axis (e.g., A-axis) and the front surface 200 of the electronic device 101 may be in the folded state (e.g., the closed state). FIG. 2B is a view illustrating the third surface 213 of the first housing 210 and the fourth surface 223 of the second housing 220 in the folded state of the electronic device 101.

According to various embodiments, in the folded state of the electronic device 101, the first display 230 may be turned off and the second display 240 may be turned on. When a user's input has not been detected for a predetermined time in a state where the second display 240 is turned on, the electronic device 101 may turn off the second display 240. When a button formed (or mounted) on the electronic device 101 is selected when the electronic device 101 is in the folded state and the second display 240 is turned off, the electronic device 101 may turn on the second display 240. When a user's input is detected on the second display 240 after the second display 240 is turned off when the electronic device 101 is in the folded state, the electronic device 101 may turn on the second display 240.

FIG. 2C is a diagram illustrating an intermediate state or an unfolded state of a foldable electronic device according to various embodiments.

The foldable electronic device shown in FIGS. 2A and 2B illustrates an example of an electronic device in which lengths of two lateral surfaces (e.g., upper and lower lateral surfaces and left and right lateral surface) parallel with each other are similar, and the foldable electronic device shown in FIG. 2C illustrates an example of an electronic device in which a first length of two parallel lateral surfaces (e.g., upper and lower lateral surfaces) is either longer or shorter than a second length of the other two lateral surfaces (e.g., left and right lateral surfaces) The foldable electronic device in FIGS. 2A and 2B and the foldable electronic device in FIG. 2C may have the same or similar structure or operation as an electronic device, with different appearances.

Referring to FIG. 2C, the electronic device 101 may include the hinge structure 260 around the folding axis (e.g., A-axis) and may be in the intermediate state 201 where the first housing 210 and the second housing 220 are arranged to have a predetermined angle therebetween. For example, in the intermediate state 201, a surface of the first housing 210 or the second housing 220 is placed on a floor and the second housing 220 placed on the floor and the first housing 210 not placed on the floor may have a predetermined angle therebetween. In the drawing, it is described the case that the fourth surface 223 of the second housing 220 is placed on the floor, and the first surface 211 of the first housing 210 and the second surface 221 of the second housing 220 have a predetermined angle therebetween.

According to various embodiments, in the intermediate state 201, the first display 230 may be activated and a user interface may be displayed through the first display 230. The user interface may be displayed through the entire screen of the first display 230 or may be displayed divided into two portions (or areas) such as a split screen. In the intermediate state, an output unit (e.g., an application execution screen) may be displayed through the first surface 211 of the first housing 210, and an input unit (e.g., a keypad) may be displayed through the second surface 221 of the second housing 220.

With respect to the rear surface 203, a cover display (e.g., the display module 160 in FIG. 1 or the second display 240 in FIGS. 2A to 2C) may be included in a portion of the rear surface 203 in the third surface 213 of the first housing 210 of the electronic device 101. Multiple cameras 215 to 217 and a sensor area 241 may be further included next to the second display 240.

A foldable electronic device (e.g., the electronic device 101 in FIG. 1) according to an example embodiment of the disclosure may include: a first housing (e.g., the first housing 210 in FIGS. 2A to 2C) and a second housing (e.g., the second housing 220 in FIGS. 2A to 2C) disposed on opposite sides with respect to a folding axis and configured to be folded relative to each other, a first display (e.g., the first display 230 in FIG. 2A to 2C) disposed to face a first direction of the first housing and the second housing, a second display (e.g., the second display 240 in FIGS. 2A to 2C) disposed to face a second direction opposite the first direction of one of the first housing or the second housing, a sensor module including at least one sensor (e.g., the sensor module 176 in FIG. 1), a memory (e.g., the memory 130 in FIG. 1), and at least one processor, comprising processing circuitry (e.g., the processor 120 in FIG. 1), operatively connected to the first display, the second display, the sensor module, and/or the memory, wherein the instructions that, when executed by the at least one processor, individually and/or collectively, cause the foldable electronic device to: acquire sensing data from the sensor module in an unfolded state of a foldable electronic device, where one surface of the first housing and one surface of the second housing are arranged to face an identical direction, determine, based on the sensing data, whether the foldable electronic device corresponds to a designated condition, and based on the foldable electronic device corresponding to the designated condition, deactivate the first display and activate the second display.

The sensor module may include an acceleration sensor or a gyroscope sensor, and at least one processor, individually and/or collectively, may be configured to: acquire, in the unfolded state of the foldable electronic device, acceleration data from the acceleration sensor, acquire angular velocity data from the gyroscope sensor, and determine whether the foldable electronic device is in a state where the foldable electronic device is turned over and motionless or in a horizontal state, based on the acceleration data or the angular velocity data.

The state where the foldable electronic device is turned over may correspond to a state where the front surface of the foldable electronic device, at which the first display is disposed, is placed downward, and the rear surface of the foldable electronic device, at which the second display is disposed, is placed upward.

The sensor module may further include a proximity sensor or an illuminance sensor, and at least one processor, individually and/or collectively, may be configured to: based on the foldable electronic device being in the state where the foldable electronic device is turned over and motionless or being in the horizontal state, acquire proximity data from the proximity sensor, acquire illuminance data from the illuminance sensor, and determine whether the foldable electronic device is in a state where the front surface of the foldable electronic device is placed in contact with an object, based on the proximity data or the illuminance data.

At least one processor, individually and/or collectively, may be configured to, based on the foldable electronic device being in a state where the front surface of the foldable electronic device is placed in contact with an object, activate the second display.

At least one processor, individually and/or collectively, may be configured to, based on wireless charging being requested in the unfolded state of the foldable electronic device, acquire first sensing data from the sensor module.

At least one processor, individually and/or collectively, may be configured to, based on the foldable electronic device corresponding to a designated condition, activate the second display and provide guide information associated with wireless charging through the second display.

At least one processor, individually and/or collectively, may be configured to: cause the foldable electronic device to perform wireless charging in a state corresponding to a designated condition, acquire second sensing data from the sensor module, and determine whether the foldable electronic device does not correspond to the designated condition, based on the second sensing data.

At least one processor, individually and/or collectively, may be configured to, based on the foldable electronic device not corresponding to a designated condition, deactivate the second display.

At least one processor, individually and/or collectively, may be configured to, based on the foldable electronic device not corresponding to a designated condition, activate the first display and stop the wireless charging.

Figure 3:
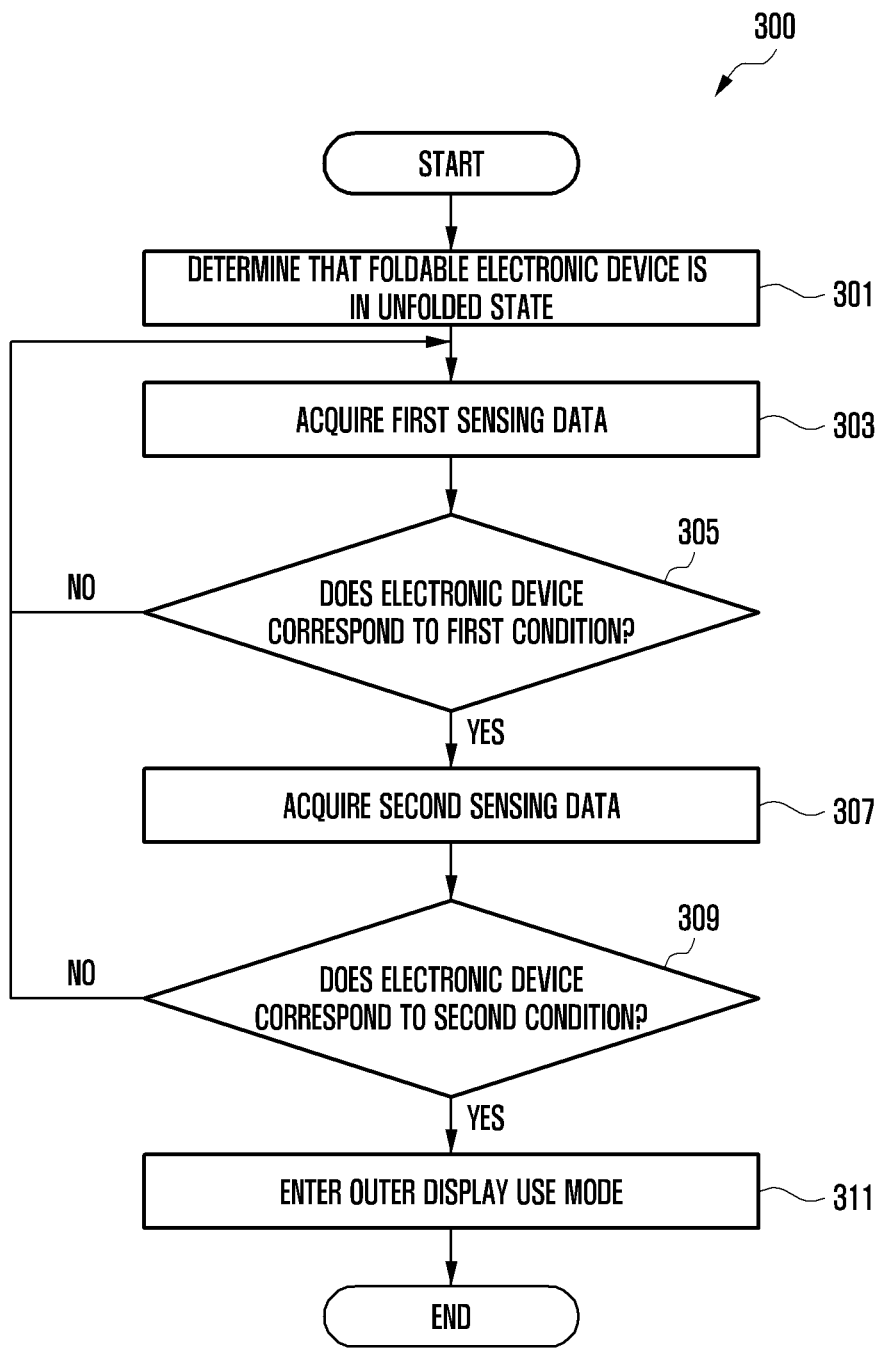
FIG. 3 is a flowchart illustrating an example method of operating a foldable electronic device according to various embodiments.

FIG. 3 is a flowchart 300 illustrating an example method of operating a foldable electronic device according to various embodiments.

Referring to FIG. 3, in operation 301, a processor (e.g., the processor 120 in FIG. 1) of the foldable electronic device (e.g., the electronic device 101 in FIG. 1) according to an embodiment may determine that the foldable electronic device 101 is in the unfolded state. The foldable electronic device 101 may include a first housing (e.g., the first housing 210 in FIGS. 2A to 2C) including a first surface (e.g., the first surface 211 in FIGS. 2A to 2C) and a third surface (e.g., the third surface 213 in FIGS. 2A to 2C) and a second housing (e.g., the second housing 220 in FIGS. 2A to 2C) including a second surface (e.g., the second surface 221 in FIGS. 2A to 2C) and a fourth surface (e.g., the fourth surface 223 in FIGS. 2A to 2C). The first housing 210 and the second housing 220 may be arranged on opposite sides with respect to the folding axis (e.g., A-axis) and may have substantially symmetric shapes with respect to the folding axis.

The unfolded state may indicate a state where the first housing 210 and the second housing 220 are arranged in parallel and may indicate a state where the foldable electronic device 101 is fully unfolded. In the unfolded state, the angle between the first housing 210 and the second housing 220 is 180 degrees and the first surface 211 of the first housing 210 and the second surface 221 of the second housing 220 may be arranged to face an identical direction (e.g., a first direction (e.g., FIG. 2A). The processor 120 may determine whether the foldable electronic device 101 is in the unfolded state using a sensor module (e.g., the sensor module 176 in FIG. 1) disposed in at least one of the first housing 210 or the second housing 220.

In operation 303, the processor 120 may acquire first sensing data. The processor 120 may acquire a sensing value using the sensor module 176 when the foldable electronic device 101 is in the unfolded state. The sensor module 176 may include at least one of an acceleration sensor, a gyroscope sensor, a geomagnetic sensor, a proximity sensor, a light sensor, a gesture sensor, or a Hall sensor. The first sensing data (or first sensing value) may include acceleration data (or an acceleration value) or angular velocity data (e.g., an angular velocity value). For example, the processor 120 may acquire acceleration data from the acceleration sensor as the first sensing data. Alternatively, the processor 120 may acquire angular velocity data from the gyroscope sensor as the first sensing data.

In operation 305, the processor 120 may determine whether the foldable electronic device 101 corresponds to a first condition, based on the first sensing data. For example, the first condition may be related to that an outer display (e.g., the second display 240 in FIGS. 2A to 2C) of the foldable electronic device 101 is activated. Referring to FIG. 2A, an inner display (e.g., the first display 230 in FIGS. 2A to 2C) may be disposed on a front surface (e.g., the front surface 200 in FIG. 2A) of the foldable electronic device 101, and a second display 240 may be disposed on one surface (e.g., the second surface 213) of a rear surface (e.g., the rear surface 250 in FIG. 2A) of the foldable electronic device 101.

The first condition may be related to whether the foldable electronic device 101 is in the state wherein the foldable electronic device is turned over and motionless or is in the horizontal state. The state where the foldable electronic device is turned over may indicate a state where the foldable electronic device 101 is placed so that the front surface 200 of the foldable electronic device 101 faces the downward direction (e.g., the ground) and the rear surface 250 of the foldable electronic device 101 faces the upward direction (e.g., the sky). That is, the state where the foldable electronic device is turned over may indicate a state where the front surface 200 of the foldable electronic device 101 faces downward, and the user views the rear surface 250 of the foldable electronic device 101 in the unfolded state of the foldable electronic device 101.

The processor 120 may perform operation 307 when the foldable electronic device 101 corresponds to the first condition (yes in operation 305) and may return to operation 303 when the foldable electronic device 101 does not correspond to the first condition (no in operation 305). When the foldable electronic device 101 does not correspond to the first condition, the processor 120 may acquire the first sensing data. The processor 120 may acquire the first sensing data in real time or periodically in the unfolded state of the foldable electronic device 101 so as to determine whether the foldable electronic device 101 corresponds to the first condition.

When the foldable electronic device 101 corresponds to the first condition, in operation 307, the processor 120 may acquire the second sensing data. The second sensing data may include proximity data (or a proximity sensing value) or illuminance data (or an illuminance sensing value). For example, the processor 120 may acquire proximity data from the proximity sensor as the second sensing data. Alternatively, the processor 120 may acquire illuminance data from the illuminance sensor as the second sensing data.

In operation 309, the processor 120 may determine whether the foldable electronic device 101 corresponds to a second condition, based on the second sensing data. For example, the second condition may be related to that the second display 240 of the foldable electronic device 101 is activated. The second condition may be related to whether the foldable electronic device 101 is placed so that the front surface thereof is in contact with an object like a desk (or table or floor). The proximity sensor or the illuminance sensor may be disposed on the front surface (e.g., the first surface 211 or the second surface 221) of the foldable electronic device 101. When the front surface of the foldable electronic device 101 is in contact with the desk in the unfolded state of the foldable electronic device 101, it may be determined that the proximity sensor is close to an object (e.g., the desk) by the desk. Likewise, when the front surface of the foldable electronic device 101 is in contact with the desk in the unfolded state of the foldable electronic device 101, the amount of light is reduced because the front of the illuminance sensor is blocked by the desk, so it may be determined that the object is close.

The processor 120 may perform operation 311 when the foldable electronic device 101 corresponds to the second condition (yes in operation 309) and may return to operation 303 when the foldable electronic device 101 does not correspond to the second condition (no in operation 309). When the foldable electronic device 101 does not correspond to the second condition, the processor 120 may return to operation 303, acquire the first sensing data in real time or periodically, and determine whether the foldable electronic device 101 corresponds to the first condition.

When the foldable electronic device 101 corresponds to the second condition, in operation 311, the processor 120 may enter an outer display use mode. The outer display use mode may correspond to a mode where the second display 240 is activated (e.g., turned on). For example, conventionally, when the foldable electronic device 101 is turned over and placed on a desk in an unfolded state, the second display 240 may be inactivated (e.g., turned off), and an inner display (e.g., the first display 230 in FIGS. 2A to 2C) may also be inactivated after a certain time period. That is, in such a conventional manner, the user may not be able to use the second display 240 when the foldable electronic device 101 is turned over and placed on a desk in the unfolded state.

However, in the disclosure, the electronic device may be controlled so that the user may be able to use the second display 240 instead of the first display 230 even when the foldable electronic device 101 is turned over and placed on a desk in the unfolded state. When the foldable electronic device 101 corresponds to the first condition and the second condition, the processor 120 may activate the second display 240. When the second display 240 is activated, the processor 120 may inactivate the first display 230.

In the flowchart, it is described that the first condition is determined and then the second condition is determined, but the processor 120 may determine the second condition and then determine the first condition or concurrently determine the first condition and the second condition.

Figure 4:
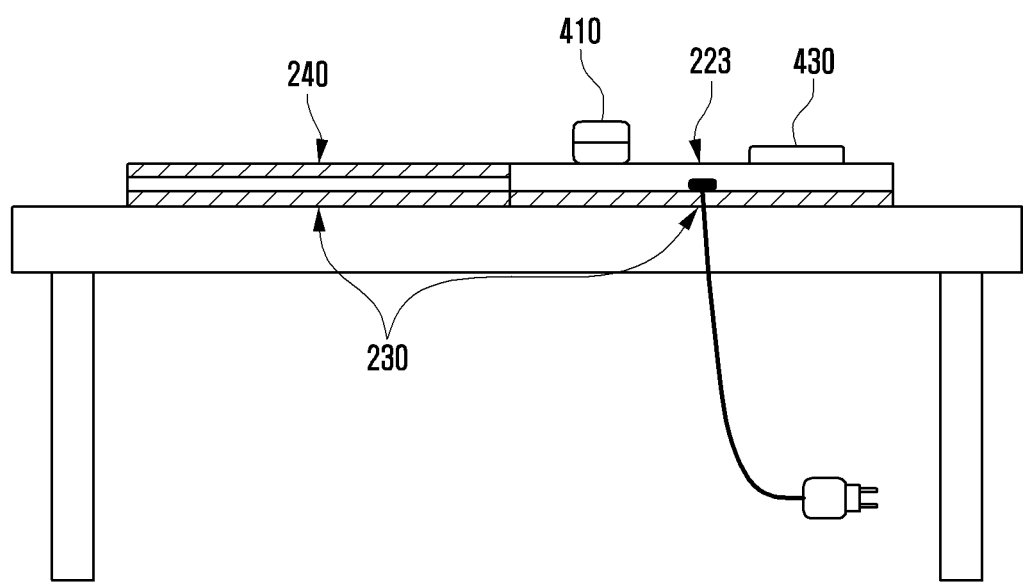
FIG. 4 is a diagram illustrating an example in which a foldable electronic device is turned over in an unfolded state according to various embodiments.

FIG. 4 is a diagram illustrating an example in which a foldable electronic device is turned over in an unfolded state according to various embodiments.

Referring to FIG. 4, the foldable electronic device (e.g., the electronic device 101 in FIG. 1) according to an embodiment may be turned over and placed on a desk in the unfolded state. The foldable electronic device 101 may include a first housing (e.g., the first housing 210 in FIGS. 2A to 2C) including a first surface (e.g., the first surface 211 in FIGS. 2A to 2C) and a third surface (e.g., the third surface 213 in FIGS. 2A to 2C) and a second housing (e.g., the second housing 220 in FIGS. 2A to 2C) including a second surface (e.g., the second surface 221 in FIGS. 2A to 2C) and a fourth surface (e.g., the fourth surface 223 in FIGS. 2A to 2C). The unfolded state may indicate a state where the first housing 210 and the second housing 220 are arranged in parallel and may indicate a state where the foldable electronic device 101 is fully unfolded. In the unfolded state, the angle between the first housing 210 and the second housing 220 is 180 degrees and the first surface 211 of the first housing 210 and the second surface 221 of the second housing 220 may be arranged to face an identical direction (e.g., a first direction) (e.g., FIG. 2A).

The state where the foldable electronic device is turned over and placed may indicate a state where the foldable electronic device 101 is placed so that the front surface (e.g., the front surface 200 in FIG. 2A) of the foldable electronic device 101 faces the downward direction (e.g., the ground) and the rear surface (e.g., the rear surface 250 in FIG. 2A) of the foldable electronic device 101 faces the upward direction (e.g., the sky). For example, the state where the foldable electronic device is turned over may indicate a state where the front surface 200 of the foldable electronic device 101 faces downward, and the user views the rear surface 250 of the foldable electronic device 101 in the unfolded state of the foldable electronic device 101. That is, the front surface 200 of the foldable electronic device 101 may be in contact with the desk.

An inner display (e.g., the first display 230 in FIGS. 2A to 2C) may be disposed on the front surface 200 of the foldable electronic device 101, and the second display 240 may be disposed on one surface (e.g., the second surface 213) of the rear surface 250 of the foldable electronic device 101. When the foldable electronic device 101 is turned over and placed in the unfolded state, the first display 230 may face the ground and the user may view the second display 240. The foldable electronic device 101 may, when it is determined that the foldable electronic device 101 is turned over and placed in the unfolded state based on the sensing data acquired through the sensor module (e.g., the sensor 176 in FIG. 1), inactivate the first display 230 and activate the second display 240.

The user may request wireless charging through the second display 240, and the foldable electronic device 101 may provide wireless charging through the fourth surface 223 on which the second display 240 is not disposed. For example, the foldable electronic device 101 may provide power to a first external device 410 or a second external device 430 placed on the fourth surface 223 according to the request of the user for wireless charging. When performing wireless charging, the foldable electronic device 101 may display guide information (e.g., a wireless charging state, a wireless charging position, or the like) associated with the wireless charging through the second display 240. In addition, when performing wireless charging, the foldable electronic device 101 may be connected to the first external device 410 or the second external device 430 through wireless communication (e.g., Bluetooth or NFC) and transmit or receive data to or from the first external device 410 or the second external device 430.

Figure 5:
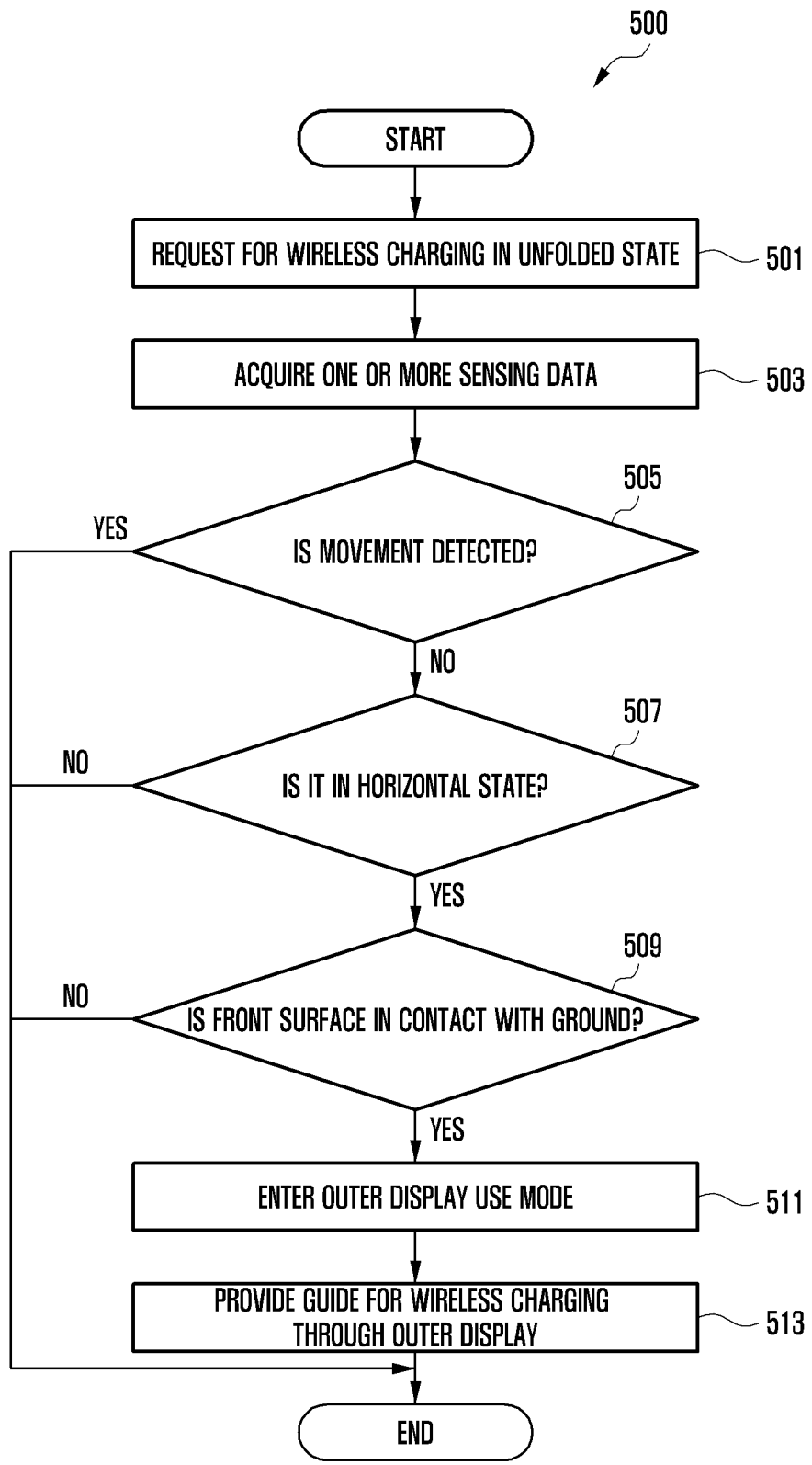
FIG. 5 is a flowchart illustrating an example method for performing wireless charging and using an outer display in a foldable electronic device according to various embodiments.

FIG. 5 is a flowchart 500 illustrating a example method for performing wireless charging and using an outer display in a foldable electronic device according to various embodiments.

Referring to FIG. 5, in operation 501, a processor (e.g., the processor 120 in FIG. 1) of the foldable electronic device (e.g., the electronic device 101 in FIG. 1) according to an embodiment may receive a request for wireless charging in the unfolded state. In the foldable electronic device 101, wireless charging may be inactivated by default. For example, the processor 120 may receive a request to change the wireless charging from inactivated to activated through a configuration menu of the foldable electronic device 101. When the wireless charging is changed to be activated according to the user input, the processor 120 may determine that the wireless charging is requested.

In operation 503, the processor 120 may acquire one or more sensing data. The processor 120 may acquire one or more sensing data (or sensing values) using the sensor module 176 when the foldable electronic device 101 is in the unfolded state. The sensor module 176 may include at least one of an acceleration sensor, a gyroscope sensor, a geomagnetic sensor, a proximity sensor, a light sensor, a gesture sensor, or a Hall sensor. For example, the processor 120 may acquire at least one of acceleration data, angular velocity data, proximity data, or illuminance data.

In operation 505, the processor 120 may determine whether movement is detected in the foldable electronic device 101. Since the foldable electronic device 101 needs to be in contact with an external device (e.g., a wearable device (e.g., a watch), or a wireless input/output device (e.g., the earbud)) for wireless charging, the wireless charging may not be performed while detecting movement of the foldable electronic device 101. The processor 120 may determine whether movement of the foldable electronic device 101 is detected, based on acceleration data.

The processor 120 may perform operation 507 when movement is not detected in the foldable electronic device 101 and may end operation 507 when movement is not detected in the foldable electronic device 101. The wireless charging may not be performed when movement is not detected in the foldable electronic device 101, and thus the processor 120 may provide a guide indicating that the wireless charging is not possible.

When movement is not detected in the foldable electronic device 101, in operation 507, the processor 120 may determine whether the foldable electronic device 101 is in the horizontal state. Since the foldable electronic device 101 needs to be in contact with an external device (e.g., a wearable device) for wireless charging, the foldable electronic device 101 needs to be maintained in the horizontal state. The processor 120 may determine whether the foldable electronic device 101 is in the horizontal state, based on angular velocity data.

The processor 120 may perform operation 509 when the foldable electronic device 101 is in the horizontal state and may end operation 509 in case the foldable electronic device 101 is not in the horizontal state. The wireless charging may not be performed in case the foldable electronic device 101 is not in the horizontal state, and thus the processor 120 may provide a guide indicating that the wireless charging is not possible.

When the foldable electronic device 101 is in the horizontal state, in operation 509, the processor 120 may determine whether the front surface (e.g., the front surface 200 in FIG. 2A) of the foldable electronic device 101 is in contact with the ground. For example, the processor 120 may determine whether the front surface 200 of the foldable electronic device 101 is in contact with the ground like a desk, based on proximity data or illuminance data. An inner display (e.g., the first display 230 in FIGS. 2A to 2C) may be disposed on the front surface 200 of the foldable electronic device 101, and the second display 240 may be disposed on one surface (e.g., the second surface 213) of the rear surface (e.g., the rear surface 250 in FIG. 2A) of the foldable electronic device 101. The state where the front surface 200 of the foldable electronic device 101 is in contact with the ground may indicate a state where the foldable electronic device 101 is placed so that the front surface 200 of the foldable electronic device 101 faces the downward direction (e.g., the ground) and the rear surface 250 of the foldable electronic device 101 faces the upward direction (e.g., the sky). When the foldable electronic device 101 is placed so that the front surface 200 of the foldable electronic device 101 faces downward in the unfolded state of the foldable electronic device 101, the user may view the rear surface 250 of the foldable electronic device 101.

The processor 120 may perform operation 511 when the front surface 200 of the foldable electronic device 101 is in contact with the ground and may end operation 511 when the front surface 200 of the foldable electronic device 101 is not in contact with the ground.

When the front surface 200 of the foldable electronic device 101 is in contact with the ground, in operation 511, the processor 120 may enter an outer display use mode. The outer display use mode may correspond to a mode where the second display 240 is activated (e.g., turned on). When the foldable electronic device 101 is turned over and placed on a desk in the unfolded state, the processor 120 may inactivate the first display 230 and instead activate the second display 240.

In operation 513, the processor 120 may provide a guide for wireless charging through the outer display. When the foldable electronic device 101 is turned over and placed in the unfolded state, the first display 230 may face the ground and the user may view the second display 240. The processor 120 may provide a guide that wireless charging is possible through the second display 240 by causing an external device to be in contact with the fourth surface (e.g., the fourth surface 223 in FIG. 2A) on which the second display 240 is not disposed. The processor 120 may display guide information (e.g., a wireless charging state, a wireless charging position, or the like) associated with the wireless charging through the second display 240 during wireless charging. The user may place the external device on the fourth surface 223 by considering the guide information. The processor 120 may provide power of a battery (e.g., the battery 189 in FIG. 1) to at least one external device placed on the fourth surface 223. The user may use the second display 240 and concurrently perform wireless charging.

According to an embodiment, the processor 120 may be connected to the external device through wireless communication (e.g., Bluetooth or NFC) and transmit or receive data to or from the external device while performing wireless charging.

In the flowchart, although it is described that operation 505 is performed first, and operations 507 and 509 are performed sequentially, the processor 120 may perform operation 507 and sequentially perform operation 505 and operation 509, or perform operation 509 first and sequentially perform operation 505 or operation 507. The processor 120 may concurrently perform operations 505, 507, and 509. This is merely an implementation issue, and the disclosure is not limited thereto.

Figure 6A:
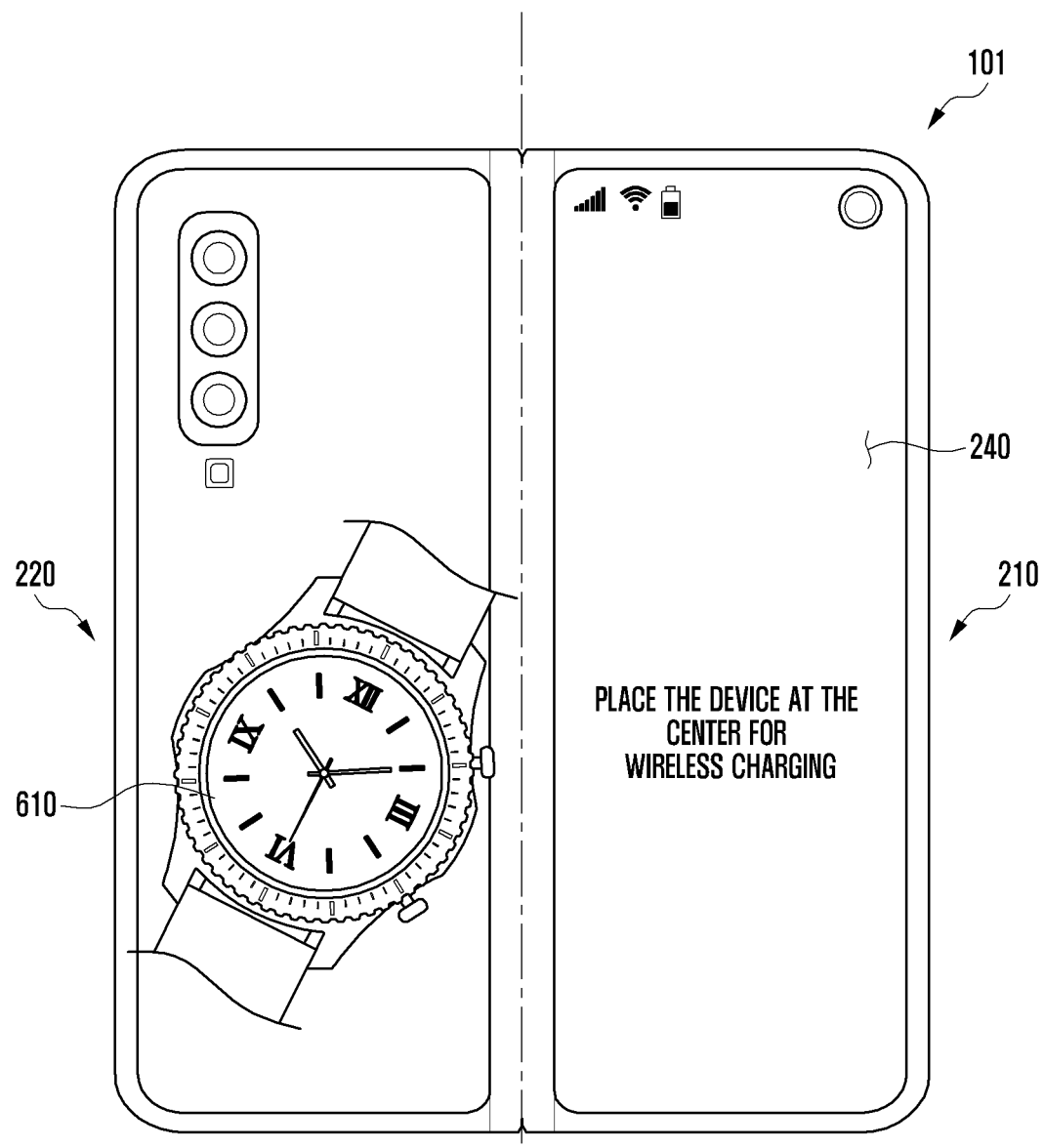
FIGS. 6A and 6B are diagrams illustrating an example of performing wireless charging and using an outer display in a foldable electronic device according to various embodiments.
Figure 6B:
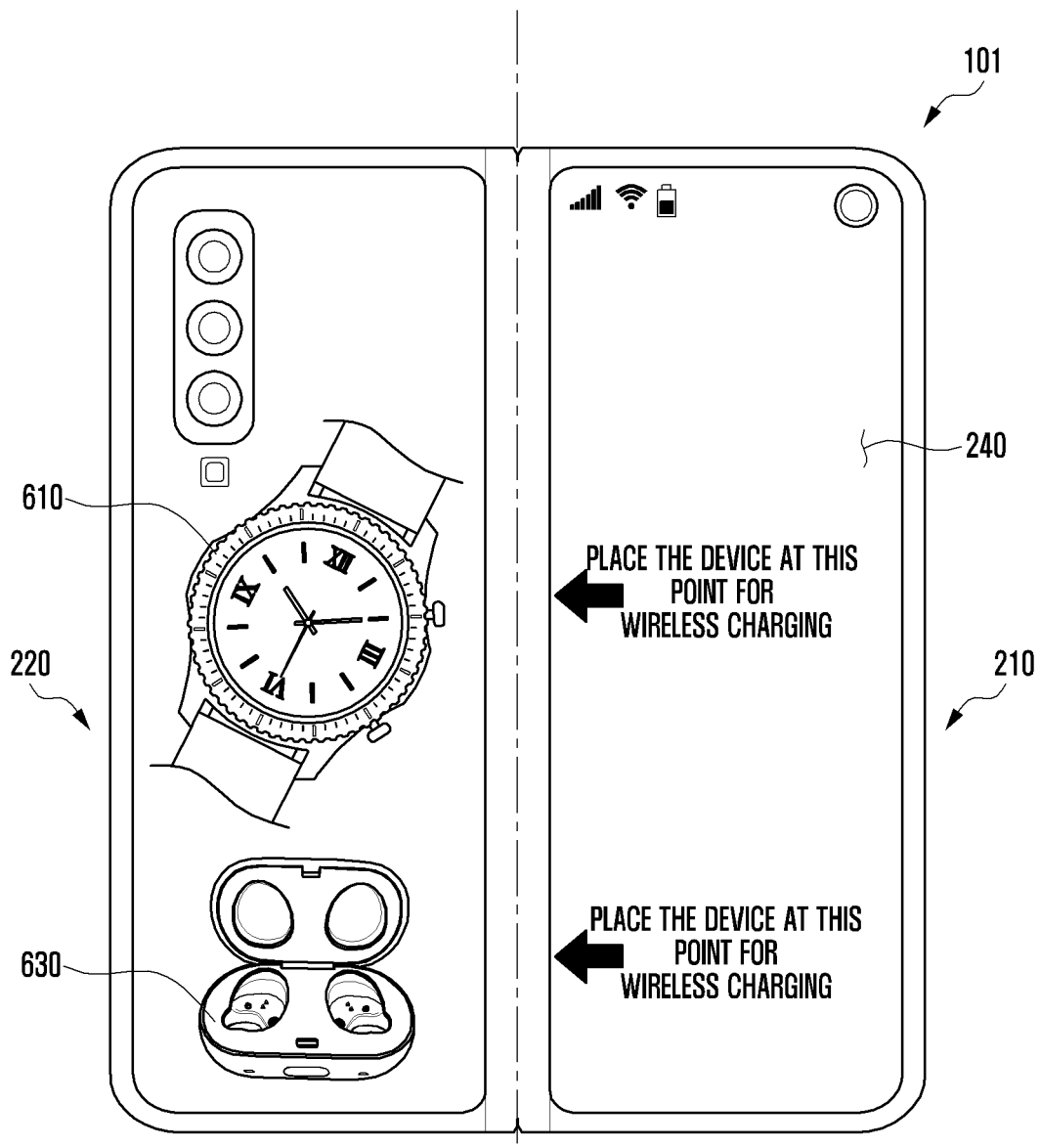

FIGS. 6A and 6B are diagrams illustrating an example of performing wireless charging and using an outer display in a foldable electronic device according to various embodiments.

Referring to FIG. 6A, when the foldable electronic device (e.g., the electronic device 101 in FIG. 1) is turned over and placed on a desk in the unfolded state, the foldable electronic device may display guide information (e.g., "Place the device at the center for wireless charging") associated with wireless charging on an outer display (e.g., the second display 240 in FIG. 2A) and provide power to a first external device 610 in contact with the foldable electronic device 101. The user may not know an exact position of a coil for wireless charging in the foldable electronic device 101. The guide information may provide a guide for a wireless charging position or include a wireless charging state (e.g., –% charged). The user may use the second display 240 and concurrently perform wireless charging. While performing wireless charging, the foldable electronic device 101 may be connected to the first external device 610 through wireless communication according to a user's request and transmit or receive data.

Referring to FIG. 6B, when the foldable electronic device (e.g., the electronic device 101 in FIG. 1) is turned over and placed on a desk in the unfolded state, the foldable electronic device may display guide information (e.g., "Place the device at this point (arrow) for wireless charging") associated with wireless charging on an the second display 240 and provide power to a first external device 610 and a second external device 630 in contact with the foldable electronic device 101. The foldable electronic device 101 may concurrently provide wireless charging power to two external devices. In this case, since the user may not know the position of a coil for wireless charging in the foldable electronic device 101, the foldable electronic device 101 may provide a guide for a wireless charging position. The user may use the second display 240 of the foldable electronic device 101 while performing charging the first external device 610 and the second external device 630 through the foldable electronic device 101. When performing wireless charging, the foldable electronic device 101 may be connected to the first external device 610 or the second external device 630 through wireless communication according to a user's request and transmit or receive data to or from the first external device 610 or the second external device 630.

Figure 7:
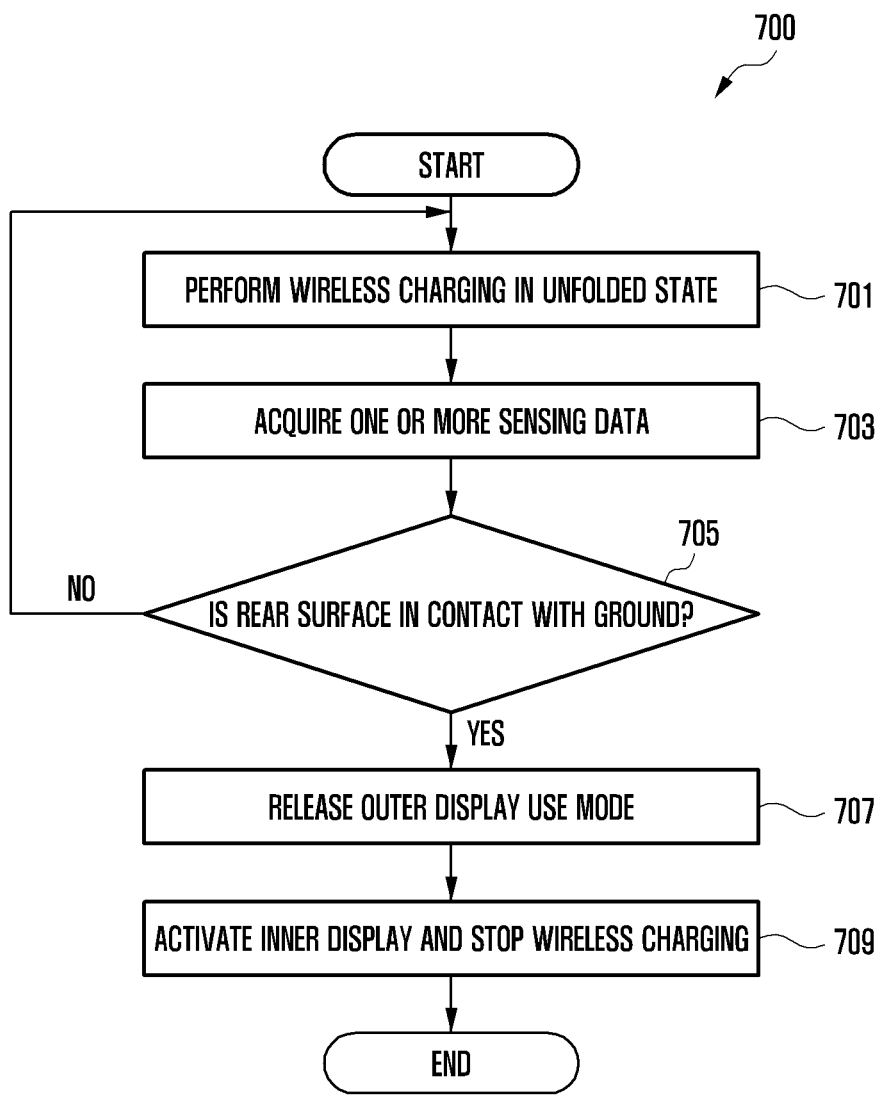
FIG. 7 is a flowchart illustrating an example method for deactivating an outer display in a foldable electronic device according to various embodiments.

FIG. 7 is a flowchart 700 illustrating an example method for inactivating (deactivating) an outer display in a foldable electronic device according to various embodiments. FIG. 7 may illustrate operations performed after operation 311 in FIG. 3 or operation 513 in FIG. 5.

Referring to FIG. 7, in operation 701, a processor (e.g., the processor 120 in FIG. 1) of the foldable electronic device (e.g., the electronic device 101 in FIG. 1) according to an embodiment may perform wireless charging in the unfolded state. An inner display (e.g., the first display 230 in FIGS. 2A to 2C) may be disposed on the front surface (e.g., the front surface 200 in FIG. 2A) of the foldable electronic device 101, and the second display 240 may be disposed on one surface (e.g., the second surface 213) of the rear surface (e.g., the rear surface 250 in FIG. 2A) of the foldable electronic device 101. The foldable electronic device 101 may provide wireless charging in the unfolded state where the foldable electronic device is placed so that the front surface 200 thereof faces the downward direction (e.g., the ground) and the rear surface 250 of the foldable electronic device 101 faces the upward direction (e.g., the sky).

In operation 703, the processor 120 may acquire one or more sensing data. The processor 120 may acquire one or more sensing data (or sensing values) using the sensor module 176 when the foldable electronic device 101 is in the unfolded state. The sensor module 176 may include at least one of an acceleration sensor, a gyroscope sensor, a geomagnetic sensor, a proximity sensor, a light sensor, a gesture sensor, or a Hall sensor. For example, the processor 120 may acquire at least one of acceleration data, angular velocity data, proximity data, or illuminance data.

In operation 705, the processor 120 may determine whether the rear surface 250 of the foldable electronic device 101 is in contact with the ground. For example, the foldable electronic device 101 may be changed to be placed so that the front surface 200 of the foldable electronic device 101 faces upward in the unfolded state, and the rear surface 250 of the foldable electronic device 101 faces downward. The processor 120 may determine whether a placing state of the foldable electronic device 101 is changed.

The processor 120 may perform operation 707 when the rear surface 250 of the foldable electronic device 101 is in contact with the ground and may return to operation 701 when the rear surface 250 of the foldable electronic device 101 is not in contact with the ground. The processor 120 may return to operation 701 when the rear surface 250 of the foldable electronic device 101 is not in contact with the ground and continuously perform wireless charging.

When the rear surface 250 of the foldable electronic device 101 is in contact with the ground, in operation 707, the processor 120 may release the outer display (e.g., the second display 240) use mode. When the foldable electronic device 101 is turned over and performs wireless charging in the unfolded state, the second display 240 may be activated and the user may use the second display 240. When the user turns over the foldable electronic device 101 to cause the rear surface 250 of the foldable electronic device 101 to be in contact with the ground in the unfolded state, the second display 240 is placed to face downward and thus the user may not view the second display 240. The processor 120 may release the outer display user mode.

In operation 709, the processor 120 may activate the inner display (e.g., the first display 230) and stop the wireless charging. When the foldable electronic device 101 is placed so that the front surface 200 of the foldable electronic device 101 faces upward in the unfolded state and the rear surface 250 of the foldable electronic device 101 faces downward, the user may view the first display 230. In this case, the processor 120 may inactivate the second display 240 and concurrently or sequentially activate the first display 230. In addition, during wireless charging, an external device needs to be in contact with the fourth surface 223, but it may not be easy to contact an external device with the fourth surface 223 in the unfolded state. The processor 120 may stop the wireless charging when the foldable electronic device 101 is placed so that the front surface 200 of the foldable electronic device 101 faces upwards in the unfolded state.

According to an embodiment, when the foldable electronic device 101 is changed to be in the folded state, the processor 120 may maintain the outer display use mode and stop the wireless charging. When the foldable electronic device 101 is placed so that the rear surface 250 of the foldable electronic device 101 faces upwards in the unfolded state, a wearable device may be charged through the fourth surface 223. When the foldable electronic device 101 is changed to be in the folded state and the fourth surface 223 is placed downward (e.g., the first housing 210 in FIG. 2B), the user may continuously use the second display 240 but have difficulty contacting the wearable device horizontally on the fourth surface 223 of the foldable electronic device 101. Here, the processor 120 may maintain the outer display use mode and stop the wireless charging.

According to an embodiment, when the foldable electronic device 101 is changed to be in the folded state, the processor 120 may maintain the outer display use mode and the wireless charging. When the foldable electronic device 101 is placed so that the rear surface 250 of the foldable electronic device 101 faces upwards in the unfolded state, an electronic device may be charged through the fourth surface 223. When the foldable electronic device 101 is changed to be in the folded state and the fourth surface 223 is placed downward (e.g., the first housing 210 in FIG. 2B), the user may continuously use the second display 240 and charge an electronic device. The electronic device may be in contact with the fourth surface 223 of the foldable electronic device 101 horizontally and thus the processor 120 may maintain the outer display use mode and maintain the wireless charging as well. This may be a method used conventionally for wireless charging through the foldable electronic device 101.

According to an example embodiment, a method of operating a foldable electronic device (e.g., the electronic device 101 in FIG. 1) including a first housing (e.g., the first housing 210 in FIGS. 2A to 2C) and a second housing (e.g., the second housing 220 in FIGS. 2A to 2C) disposed on opposite sides with respect to a folding axis and configured to be folded relative to each other may include: acquiring sensing data from a sensor module (e.g., the sensing module 176 in FIG. 1) of the foldable electronic device in an unfolded state of the foldable electronic device, where one surface of the first housing and one surface of the second housing are arranged to face an identical direction, determining, based on the sensing data, whether the foldable electronic device corresponds to a designated condition, and based on the foldable electronic device corresponding to the designated condition, activating a second display (e.g., the second display 240 in FIGS. 2A to 2C) disposed to face a second direction opposite a first direction of one of the first housing or the second housing, and an operation of deactivating a first display (e.g., the first display 230 in FIGS. 2A to 2C) disposed to face the first direction of the first housing and the second housing.

The sensor module may include an acceleration sensor and/or a gyroscope sensor, and the acquiring may include acquiring acceleration data from the acceleration sensor and acquiring angular velocity data from the gyroscope sensor in the unfolded state of the foldable electronic device.

The determining may include: determining whether the foldable electronic device is in a state where the foldable electronic device is turned over and motionless or is in a horizontal state, based on the acceleration data or the angular velocity data, and the state where the foldable electronic device is turned over may correspond to a state where the front surface of the foldable electronic device, at which the first display is disposed, is placed downward, and the rear surface of the foldable electronic device, at which the second display is disposed, is placed upward.

The sensor module may further include a proximity sensor and/or an illuminance sensor, and the acquiring may include based on the foldable electronic device being in the state where the foldable electronic device is turned over and motionless or being in the horizontal state, acquiring proximity data from the proximity sensor and acquiring illuminance data from the illuminance sensor.

The determining may include determining whether the foldable electronic device is in a state where the front surface of the foldable electronic device is placed in contact with an object, based on the proximity data or the illuminance data, and the activating may include based on the foldable electronic device being in a state where the front surface of the foldable electronic device is placed in contact with an object, activating the second display.

The acquiring may include based on wireless charging being requested from the user in the unfolded state of the foldable electronic device, acquiring first sensing data from the sensor module.

The activating may include based on the foldable electronic device corresponding to a designated condition, activating the second display and providing guide information associated with wireless charging through the second display.

The method may include: causing the foldable electronic device to perform wireless charging in a state corresponding to a designated condition, acquiring second sensing data from the sensor module, and determining whether the foldable electronic device does not correspond to the designated condition, based on the second sensing data.

The method may include based on the foldable electronic device not corresponding to a designated condition, deactivating the second display.

The method may include based on the foldable electronic device not corresponding to a designated condition, activating the first display and stopping the wireless charging.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A foldable electronic device comprising:
 a first housing and a second housing disposed on opposite sides with respect to a folding axis and configured to be folded relative to each other;
 a first display disposed to face a first direction of the first housing and the second housing;
 a second display disposed to face a second direction opposite the first direction of one of the first housing or the second housing,
 a sensor module comprising at least one sensor;
 memory storing instructions; and
 at least one processor, comprising processing circuitry, operatively connected to the first display, the second display, the sensor module, or the memory,
 wherein the instructions that, when executed by the at least one processor, individually and/or collectively, cause the foldable electronic device to:
 acquire sensing data from the sensor module in an unfolded state of a foldable electronic device where one surface of the first housing and one surface of the second housing are arranged to face a same direction;
 determine, based on the sensing data, whether the foldable electronic device corresponds to a designated condition; and
 based on the foldable electronic device corresponding to the designated condition, deactivate the first display and activate the second display.

2. The foldable electronic device of claim 1, wherein the sensor module comprises an acceleration sensor and/or a gyroscope sensor, and
 wherein the instructions, when executed by the at least one processor, individually and/or collectively, cause the foldable electronic device to:
 acquire acceleration data from the acceleration sensor and acquire angular velocity data from the gyroscope sensor in the unfolded state of the foldable electronic device; and
 determine whether the foldable electronic device is in a state where the foldable electronic device is turned over and motionless or is in a horizontal state, based on the acceleration data or the angular velocity data.

3. The foldable electronic device of claim 2, wherein the state where the foldable electronic device is turned over corresponds to a state where a front surface of the foldable electronic device, at which the first display is disposed, is placed downward, and a rear surface of the foldable electronic device, at which the second display is disposed, is placed upward.

4. The foldable electronic device of claim 2, wherein the sensor module further comprises a proximity sensor and/or an illuminance sensor, and
 wherein the instructions, when executed by the at least one processor, individually and/or collectively, cause the foldable electronic device to:
 based on the foldable electronic device being in the state where the foldable electronic device is turned over and motionless or being in the horizontal state, acquire proximity data from the proximity sensor and acquire illuminance data from the illuminance sensor; and
 determine whether the foldable electronic device is in a state where the front surface of the foldable electronic device is placed in contact with an object, based on the proximity data or the illuminance data.

5. The foldable electronic device of claim 4, wherein the instructions, when executed by the at least one processor, individually and/or collectively, cause the foldable electronic device to, based on the foldable electronic device being in the state where the front surface of the foldable electronic device is placed in contact with an object, activate the second display.

6. The foldable electronic device of claim 1, wherein the instructions, when executed by the at least one processor, individually and/or collectively, cause the foldable electronic device to, based on wireless charging being requested in the unfolded state of the foldable electronic device, acquire first sensing data from the sensor module.

7. The foldable electronic device of claim 6, wherein the instructions, when executed by the at least one processor, individually and/or collectively, cause the foldable electronic device to, based on the foldable electronic device corresponding to the designated condition, activate the second display and provide guide information associated with wireless charging through the second display.

8. The foldable electronic device of claim 7, wherein the instructions, when executed by the at least one processor, individually and/or collectively, cause the foldable electronic device to cause the foldable electronic device to:
 perform wireless charging in a state corresponding to the designated condition;
 acquire second sensing data from the sensor module; and
 determine whether the foldable electronic device does not correspond to the designated condition, based on the second sensing data.

9. The foldable electronic device of claim 8, wherein the instructions, when executed by the at least one processor, individually and/or collectively, cause the foldable electronic device to, based on the foldable electronic device not corresponding to the designated condition, deactivate the second display.

10. The foldable electronic device of claim 9, wherein the instructions, when executed by the at least one processor, individually and/or collectively, cause the foldable electronic device to, based on the foldable electronic device not corresponding to the designated condition, activate the first display and stop the wireless charging.

11. A method of operating a foldable electronic device comprising a first housing and a second housing disposed on opposite sides with respect to a folding axis and configured to be folded relative to each other, the method comprising:

acquiring sensing data from a sensor module of the foldable electronic device in an unfolded state of the foldable electronic device where one surface of the first housing and one surface of the second housing are arranged to face a same direction;

determining, based on the sensing data, whether the foldable electronic device corresponds to a designated condition;

based on the foldable electronic device corresponding to the designated condition, activating a second display disposed to face a second direction opposite a first direction of one of the first housing or the second housing; and deactivating a first display disposed to face the first direction of the first housing and the second housing.

12. The method of claim 11, wherein the sensor module comprises an acceleration sensor and/or a gyroscope sensor, and wherein the acquiring comprises acquiring acceleration data from the acceleration sensor and acquiring angular velocity data from the gyroscope sensor in the unfolded state of the foldable electronic device.

13. The method of claim 12, wherein the determining comprises determining whether the foldable electronic device is in a state where the foldable electronic device is turned over and motionless or is in a horizontal state, based on the acceleration data or the angular velocity data, and wherein the state where the foldable electronic device is turned over corresponds to a state where a front surface of the foldable electronic device, at which the first display is disposed, is placed downward, and a rear surface of the foldable electronic device, at which the second display is disposed, is placed upward.

14. The method of claim 12, wherein the sensor module further comprises a proximity sensor and/or an illuminance sensor, and wherein the acquiring comprises, based on the foldable electronic device being in the state where the foldable electronic device is turned over and motionless or is in the horizontal state, acquiring proximity data from the proximity sensor and acquiring illuminance data from the illuminance sensor.

15. The method of claim 14, wherein the determining comprises determining whether the foldable electronic device is in a state where the front surface of the foldable electronic device is placed in contact with an object, based on the proximity data or the illuminance data, wherein the activating comprises, based on the foldable electronic device being in the state where the front surface of the foldable electronic device is placed in contact with an object, activating the second display.

16. The method of claim 11, wherein the acquiring comprises based on wireless charging being requested from the user in the unfolded state of the foldable electronic device, acquiring first sensing data from the sensor module.

17. The method of claim 16, wherein the activating comprises based on the foldable electronic device corresponding to a designated condition, activating the second display and providing guide information associated with wireless charging through the second display.

18. The method of claim 17, further comprising:

causing the foldable electronic device to perform wireless charging in a state corresponding to a designated condition, acquiring second sensing data from the sensor module; and determining whether the foldable electronic device does not correspond to the designated condition, based on the second sensing data.

19. The method of claim 18, further comprising based on the foldable electronic device not corresponding to a designated condition, deactivating the second display.

20. The method of claim 19, further comprising based on the foldable electronic device not corresponding to a designated condition, activating the first display and stopping the wireless charging.

* * * * *